United States Patent
Rajaa (10) Patent No.: US 9,633,066 B1
(45) Date of Patent: Apr. 25, 2017

(54) TAKING A CONSISTENT CUT DURING REPLICATION FOR STORAGE ACROSS MULTIPLE NODES WITHOUT BLOCKING INPUT/OUTPUT

(71) Applicant: Veritas Technologies LLC, Mountain View, CA (US)

(72) Inventor: Subash Rajaa, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 296 days.

(21) Appl. No.: 14/512,668

(22) Filed: Oct. 13, 2014

(51) Int. Cl.
*G06F 17/30* (2006.01)
*G06F 9/455* (2006.01)
*H04L 29/08* (2006.01)

(52) U.S. Cl.
CPC .... *G06F 17/30371* (2013.01); *G06F 9/45533* (2013.01); *G06F 17/30174* (2013.01); *H04L 67/1097* (2013.01)

(58) Field of Classification Search
CPC .......... G06F 17/30371; G06F 9/45533; G06F 17/30174; H04L 67/1097
See application file for complete search history.

(56) References Cited

U.S. PATENT DOCUMENTS

| | | | | |
|---|---|---|---|---|
| 5,835,740 | A * | 11/1998 | Wise | G06F 9/3867 |
| | | | | 375/E7.093 |
| 8,401,997 | B1 * | 3/2013 | Tawri | G06F 11/2064 |
| | | | | 707/655 |
| 8,949,182 | B2 * | 2/2015 | Hildebrand | G06F 17/30578 |
| | | | | 707/613 |
| 2008/0028009 | A1 * | 1/2008 | Ngo | G06F 11/2097 |

* cited by examiner

Primary Examiner — Leslie Wong
(74) Attorney, Agent, or Firm — Campbell Stephenson LLP (57) ABSTRACT

A replication appliance maintains dependent-write consistency on replicated storage, for write operations made by multiple nodes to a primary storage destination, without blocking storage I/O operations. The replication appliance transmits a notification to each node, indicating to check a centralized location for a token prior to each I/O operation. The replication appliance atomically generates the token, and the nodes detect it prior to executing corresponding I/O operations. In response to detecting the token, each detecting node inserts a consistency marker in its I/O stream, proceeds with the corresponding I/O operation, and stops checking for the token. The appliance reads the I/O stream of each node, and identifies the position of the inserted consistency marker. Using the identified positions in the I/O streams, the appliance creates a consistent cut without blocking I/O operations made by the nodes. The appliance uses the cut to maintain dependent-write consistency to the replicated storage.

20 Claims, 4 Drawing Sheets

TAKING A CONSISTENT CUT DURING REPLICATION FOR STORAGE ACROSS MULTIPLE NODES WITHOUT BLOCKING INPUT/OUTPUT

TECHNICAL FIELD

This disclosure pertains generally to information management, information availability and data replication, and more specifically to creating a consistent cut that captures an ordered state of storage I/O operations by a group of computing devices to replicated storage, without blocking storage I/O on the computing devices.

BACKGROUND

Data is often one of the most valuable assets of an organization, and thus the ability for an organization to reliably access its data is of paramount importance. To protect against logical corruption of the data, or loss of data due to threats such as malware or software bugs, it should be ensured that a viable copy of the data is available at all times. Regularly scheduled backups are one tool used to protect against loss of data. However, it takes time to restore lost data from a backup, and the recovered data is only as current as the time at which the most recent backup was taken. An important tool to provide reliable access to current data is data replication, in which a physical or logical storage mechanism (e.g., device, volume, file system, etc.) is replicated by maintaining a current duplicate of the primary storage mechanism as updates are made, typically on separate hardware and often at a remote physical location. Storage replication can be utilized in the context of clustering technology, which protects against component and application failure, in order to maintain high availability of the IT infrastructure used to access data.

Clusters are groups of computers that use groups of redundant computing resources in order to provide continued service when individual system components fail. Clusters eliminate single points of failure by providing multiple servers, multiple network connections, redundant data storage, etc. Clustering systems are often combined with storage management products that provide additional useful features, such as journaling file systems, logical volume management, etc.

Where a cluster is implemented in conjunction with a storage management environment, the computer systems (nodes) of the cluster can access shared storage, such that the shared storage looks the same to each node. The shared storage is typically implemented with multiple underlying physical storage devices, which are managed by the clustering and storage system so as to appear as a single storage device to the nodes of the cluster. The multiple physical storage media can be grouped into a single logical unit which is referred to as a LUN (for "logical unit number"), and appears as a single storage device to an accessing node. Shared storage can be replicated at the LUN level, or at the level of individual logical or physical storage devices.

The management of underlying physical storage devices can also involve software level logical volume management, in which multiple physical storage devices are made to appear as a single logical volume to accessing nodes. A logical volume can be constructed from multiple physical storage devices directly, or on top of a LUN, which is in turn logically constructed from multiple physical storage devices. A volume manager can concatenate, stripe together or otherwise combine underlying physical partitions into larger, virtual ones. In a clustering environment, a cluster volume manager extends volume management across the multiple nodes of a cluster, such that each node recognizes the same logical volume layout, and the same state of all volume resources at all nodes. Data volumes can also be replicated, for example over a network to a remote site. Volume replication enables continuous data replication from a primary site to a secondary site, for disaster recovery or off host processing.

A primary storage destination can also be replicated in a variety of other contexts, such an enterprise level network with a plurality of computers accessing a physical or logical storage device, at a file system level, or at the level of a virtual disk file accessed by one or more virtual machines (VMs). When providing replication of data storage device(s) such as one or more physical, logical or virtual disks or one or more volumes, it is important to preserve the order of write operations to both the primary and replicated storage (this is known as maintaining dependent-write consistency). For example, if computer A first executes write operation 1 to the storage and subsequently computer B executes write operation 2, write operation 2 is dependent on write operation 1. The write operations must be executed in that order on both the replicated storage as well as the primary storage, or the data integrity will be corrupted.

Whenever multiple computers are conducting separate input/output (I/O) operations to one or more common storage device(s) that is being replicated, dependent-write consistency must be maintained on the replicated storage. Typically, the replication of the storage I/O operations (e.g., writes, reads, seeks, mounts, etc.) to the primary storage destination is processed by a replication manager or appliance (often within the context of the storage management environment). The replication appliance receives the I/O operations that are executed by each computer to the primary storage device, and executes the I/O operations to the replicated storage. Because the replication level processing of the storage I/O operations originating from the multiple devices can be asynchronous, the I/O operations received by the replication appliance can represent slightly different points in time, such that simply executing the operations to the replicated device in the order received could violate dependent-write consistency and corrupt the data on the replicated device. To address this, a snapshot or "consistent cut" capturing the ordered state of the I/O operations from across the multiple computers is taken periodically, to identify a point in time in the replication stream, accounting for dependent-write consistency. Conventionally, to take a consistent cut preserving dependent-write consistency in storage replication for a group of multiple computers, the storage I/O on the multiple computers is blocked. While the storage I/O is blocked, a consistency marker is added to the storage I/O stream of each computer. These consistency markers are used by the replication appliance to determine the order of write operations made by the multiple computers, and take a consistent cut preserving write order dependency. This works, but requires blocking I/O which causes delays. The more computers in the group the longer the delay that results from blocking the I/O while the consistent cut is being taken.

It would be desirable to address these issues.

SUMMARY

A replication appliance or other centralized computing device maintains dependent-write consistency on replicated storage, for write operations made by multiple computing devices to a primary storage destination, without blocking storage I/O operations. The replication appliance transmits a notification to each of a group of nodes (or other type of computing devices acting as sources of storage I/O). The notification indicates to the receiving nodes to check a centralized location (e.g., the replication appliance) for the presence of a token prior to each storage I/O operation to the primary storage destination. (In some embodiments, the notification can further indicate that any receiving node that does not have any storage I/O operations to execute is to periodically poll the centralized location for the presence of the token.) The replication appliance atomically generates the token on the centralized location. When a node checks the centralized location prior to a storage I/O operation to the primary storage destination (or otherwise polls the location), the node detects the presence of the token. Thus, multiple ones of the group of nodes detect the presence of the atomically generated token prior to executing corresponding storage I/O operations to the primary storage destination. The presence of the token indicates to each given detecting node to insert a consistency marker in its storage I/O stream, proceed with the corresponding storage I/O operation, and stop checking for the presence of the token prior to subsequent storage I/O operations.

The replication appliance asynchronously receives storage I/O operations executed by multiple ones of the nodes to the primary storage destination. It is the replication appliance's job to execute these received storage I/O operations to the replicated storage. However, the storage I/O operations received from multiples ones of the nodes can represent different points in time. The replication appliance reads the storage I/O stream of each node in the group, and identifies the position of the inserted consistency marker therein. Using the identified positions of the inserted consistency markers in the storage I/O streams of the multiple nodes, the replication appliance creates a consistent cut that captures an ordered state of storage I/O operations at a specific point in time, made by the multiple nodes to the primary storage destination. Because the replication appliance uses an atomically generated token to cause each node to insert a consistency marker in its storage I/O stream, the replication appliance is able to take the consistent cut without blocking storage I/O operations made by the multiple nodes to the primary storage destination. The replication appliance uses the consistent cut to maintain dependent-write consistency between the multiple nodes to the replicated storage. The replication appliance can take consistent cuts periodically or according to a schedule as desired. For example, the token can be deleted prior to creating a second consistent cut. The replication appliance can then repeat the steps of transmitting the notification to the nodes, atomically generating the token on the centralized location and reading the storage I/O stream of each node in the group.

In one embodiment the group of computers executing the storage I/O operations is in the form of multiple nodes in a clustering and storage environment, in which the primary storage destination is in the form of shared storage. The shared storage can be in the form of, for example, one or more volumes being replicated to a secondary site. It is to be understood that these are just example use cases, and the above described functionality can be utilized with other types of storage devices, including devices which are independent and not shared. The nodes can be in the form of any type of networked computing devices accessing any type of storage destination, such as one or more virtual or physical storage devices. Another example of replicated storage is a replicated file system. In another embodiment, the group of computing devices is in the form of multiple virtual machines running on a physical computer, and the primary storage destination is in the form of a shared virtual disk files accessed by the virtual machines.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
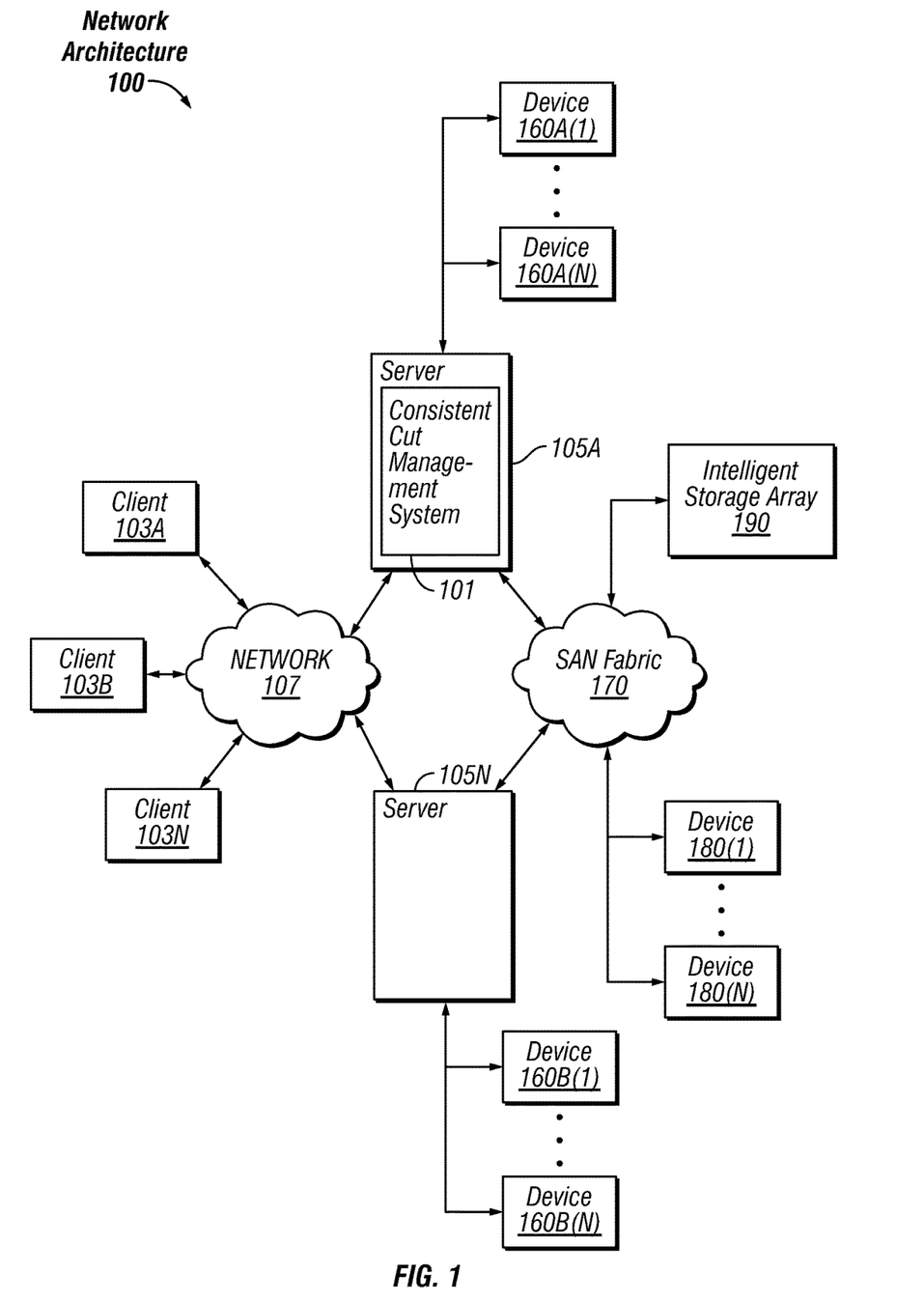
FIG. 1 is a block diagram of an exemplary network architecture in which a consistent cut management system can be implemented, according to some embodiments.

FIG. 1 is a block diagram illustrating an exemplary network architecture 100 in which a consistent cut management system 101 can be implemented. In the illustrated network architecture 100, client systems 103A, 103B and 103N, as well as servers 105A and 105N, are communicatively coupled to a network 107. A consistent cut management system 101 is illustrated as residing on server 105A, but it is to be understood that in different embodiments the consistent cut management system 101 can reside on different computers 210, or be distributed between multiple computing systems as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or handheld or wearable mobile computing devices, comprising portable computer systems capable of connecting to a network 107 and running applications.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
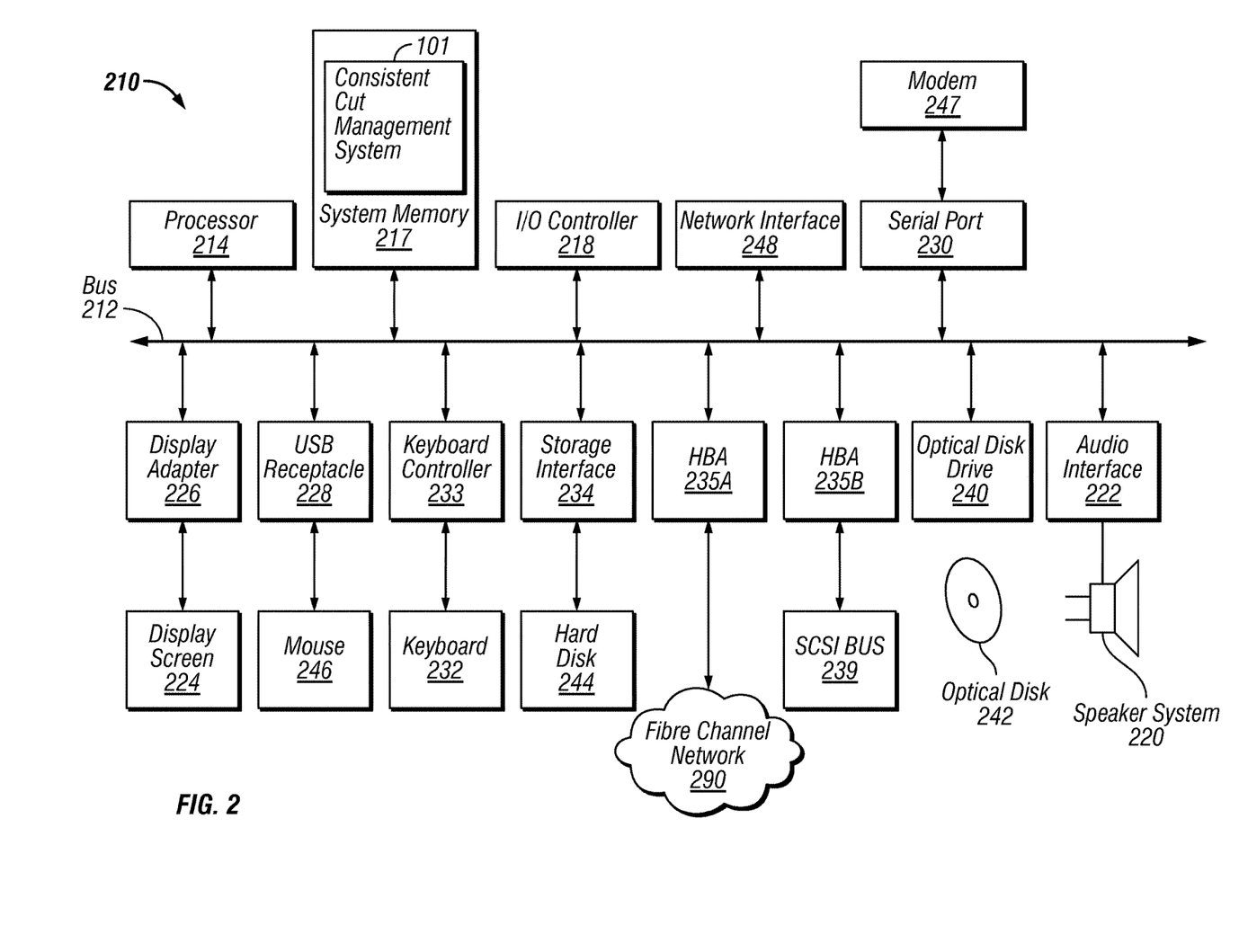
FIG. 2 is a block diagram of a computer system suitable for implementing a consistent cut management system, according to some embodiments.

FIG. 2 is a block diagram of a computer system 210 suitable for implementing a consistent cut management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the consistent cut management system 101 is illustrated as residing in system memory 217. The workings of the consistent cut management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
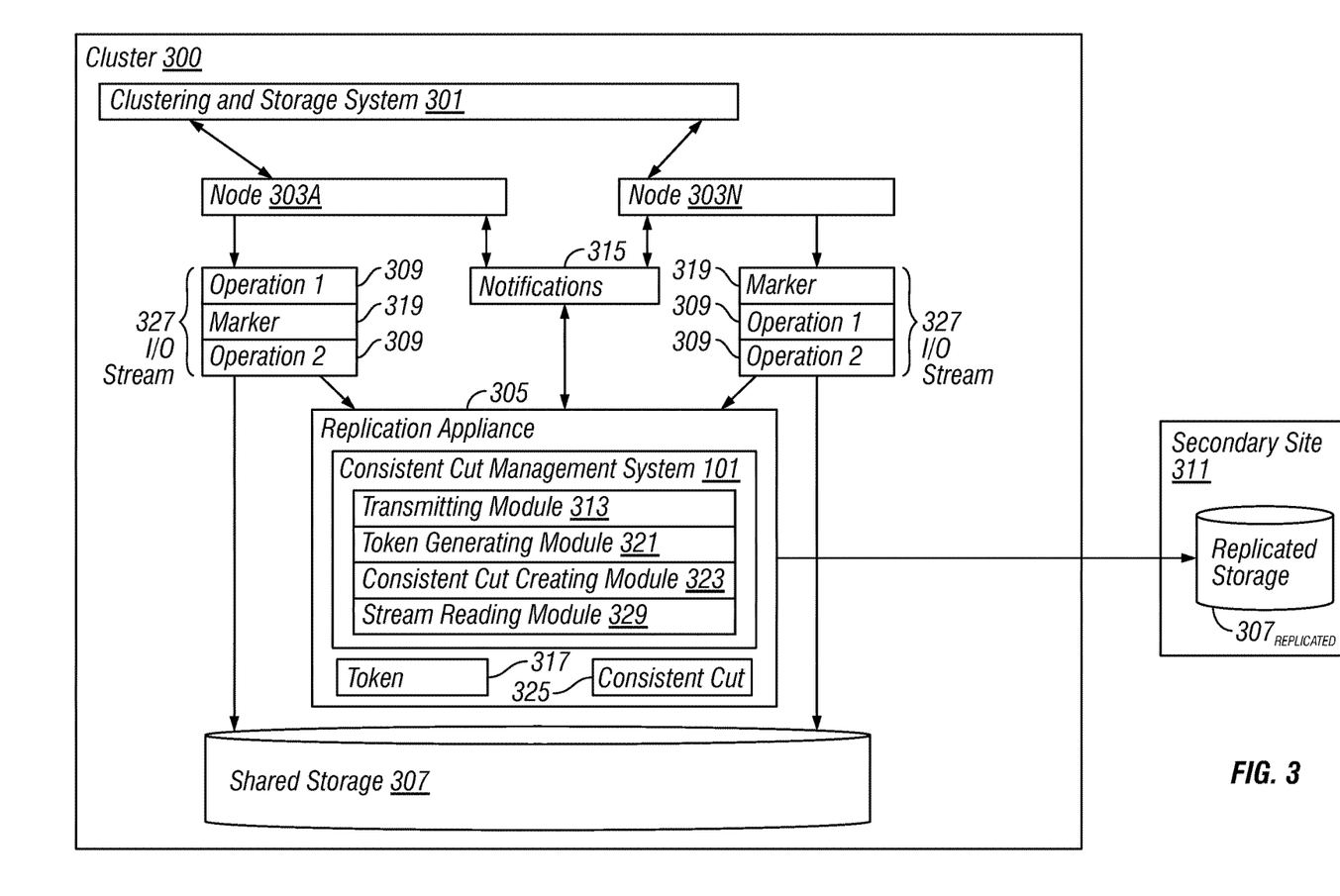
FIG. 3 is a high level block diagram of the operation of a consistent cut management system within a high availability cluster, according to some embodiments.

FIG. 3 illustrates an instance of a consistent cut management system 101 running on a replication appliance 305 in a cluster 300. In FIG. 3, the replication appliance 305 is illustrated as a single entity. In practice, the replication appliance 305 can be implemented as a dedicated hardware device, or as a component residing on one or more computing devices 210. For example, in one embodiment the replication appliance 305 is in the form of a dedicated computing device 210 programmed to perform specific replication functionalities, whereas in other embodiments the replication appliance 305 is instantiated as a component of another system, for example the clustering and storage system 301 described below.

As described above, the functionalities of the consistent cut management system 101 can reside on a server 105, a client 103, or be distributed between multiple computer systems 210, including within a fabric/cloud-based computing environment in which the functionality of the consistent cut management system 101 is provided as a service over a network 107. It is to be understood that although the consistent cut management system 101 is illustrated in FIG. 3 as a single entity, the illustrated consistent cut management system 101 represents a collection of functionalities, which can be instantiated as a single or multiple modules as desired (an instantiation of a specific, multiple module consistent cut management system 101 is illustrated in FIG. 3). It is to be understood that the modules of the consistent cut management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the consistent cut management system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

Figure 4:
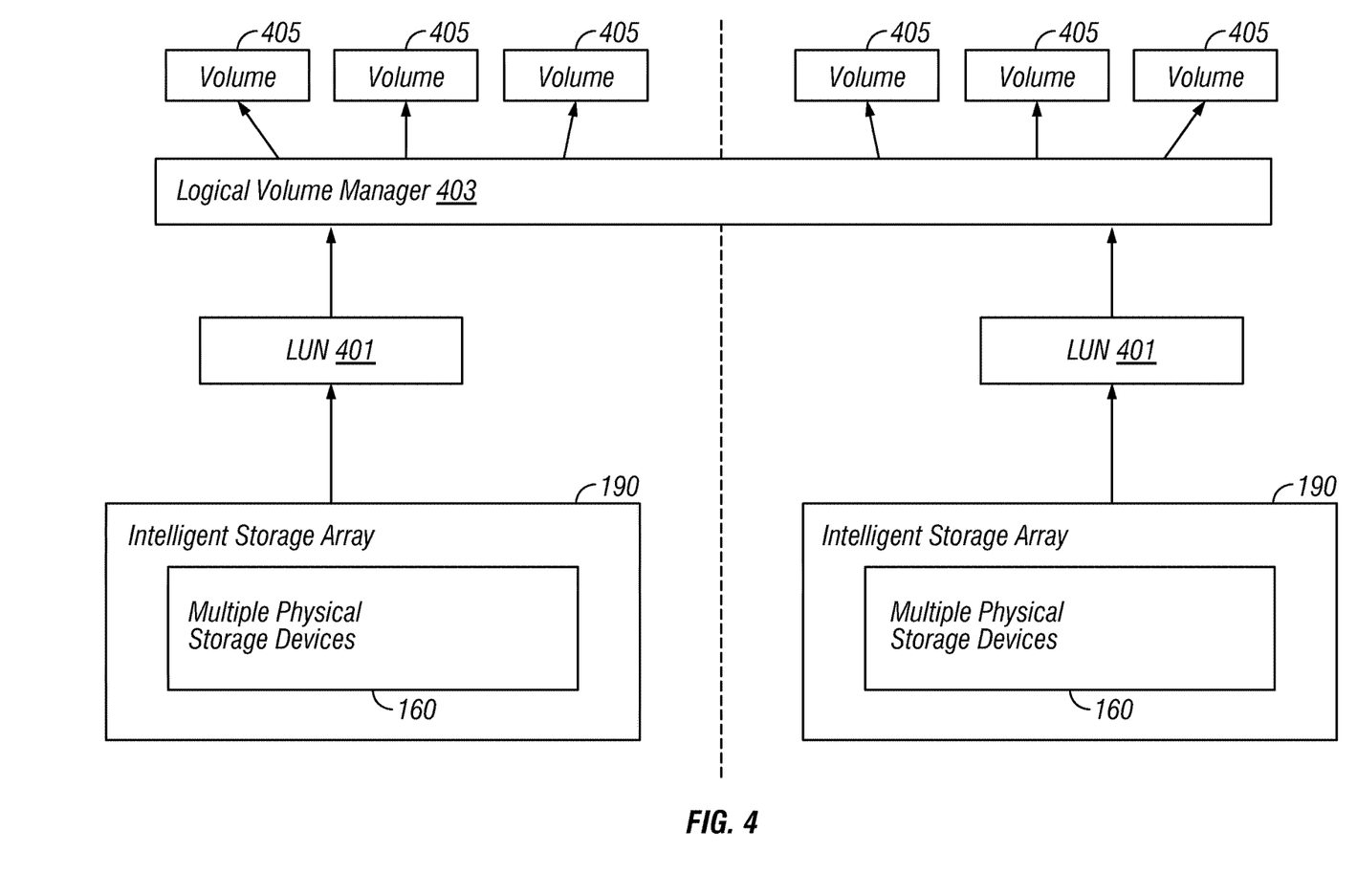
FIG. 4 is a block diagram of a shared storage architecture utilized by a consistent cut management system, according to some embodiments.

FIG. 3 illustrates a cluster 300 instantiated in the context of a clustering and storage system 301 utilizing shared storage 307, and providing replication of the shared storage 307 to a secondary site 311. For efficiency of illustration and explanation, the clustering and storage system 301 is illustrated as a centralized component residing outside of any node 303. It is to be understood that the clustering and storage system 301 represents a collection of functionalities, which in practice are typically instantiated as a plurality of components that are distributed throughout the cluster 300. The shared storage 307 is illustrated and described in conjunction with FIG. 3 as if it were a single storage device 160 with multiple volumes 405 (the volumes are illustrated in FIG. 4). In practice, the shared storage 307 is typically implemented with multiple underlying physical storage devices 160, which are managed by the clustering and storage system 301 so as to appear as a single storage device 160 with multiple volumes 405 to computer systems 210 accessing the shared storage 307. An example of the architecture of one such scenario according to one embodiment is illustrated in FIG. 4, which is discussed in more detail below.

FIG. 4 illustrates an example of a shared storage 307 architecture, according to some embodiments. Intelligent storage arrays 190 group multiple physical storage devices 160 into single logical units (LUNs) 401. Each LUN 401 appears as a single storage device 160 to an accessing node 303. The logical volume manager 403 of the clustering and storage system 301 can in turn provide software level logical volume management to create multiple logical volumes 405 on top of each LUN 401. Although Figure illustrates two LUNs 401 each of which is logically treated as three volumes 405, it is to be understood that clusters 300 can contain more or fewer LUNs 401, and that more or fewer logical volumes 405 can be built on top of a given LUN 401. It is also possible to create a single logical volume 405 from multiple LUNs 401 (not illustrated).

Returning to FIG. 3, the illustrated cluster 300 depicts two nodes 303 (node 303A and node 303N) executing storage I/O operations 309 to one shared storage device 307. It is to be understood that in other embodiments, a cluster 300 can have more nodes 303, including orders of magnitude more. The replication appliance 305 replicates the shared storage 307 in the cluster 300 to a secondary site 311, which involves maintaining a replicated copy of the shared storage $307_{REPLICATED}$. Thus in the example illustrated in FIG. 3, the shared storage 307 is the primary storage destination, and the replicated shared storage $307_{REPLICATED}$ residing on the separate site 311 is the replicated storage. It is to be understood that in different embodiments the shared storage 307 and corresponding replication can be at the level of one or more volumes 405, LUN(s) 401, physical storage devices 160, etc. Further, although FIG. 3 depicts replicated shared storage $307_{REPLICATED}$ as residing on a separate site 311, in other embodiments the replicated shared storage $307_{REPLICATED}$ can reside on the same site as the primary storage 307.

The consistent cut management system 101 enables taking a consistent cut 325 during replication of shared storage 307 and maintaining dependent-write consistency without blocking the storage I/O operations 309 of the multiple nodes 303. The consistent cut management system 101 takes consistent cuts 311 periodically as desired. The frequency and scheduling with which consistent cuts 311 are taken is a variable design parameter. In order to take a consistent cut 325, a notification transmitting module 313 of the consistent cut management system 101 transmits a notification 315 to each of the nodes 303, indicating to start checking for a token 317 before executing each storage I/O operation 309. The notification 315 transmitted to the nodes 303 can be instantiated as a packet, a control signal, indicative content or another form, directing each receiving node 303 to enter a token searching mode, which is described in more detail below.

Once the notifications 315 have been transmitted and the nodes have gone into checking mode, a token generating module 321 of the consistent cut management system 101 atomically generates a token 317 on the replication appliance 305 (or a different centralized location accessible to the nodes 303, such as a central storage repository or other mechanism under the control of the clustering and storage system 301). Because the token generating module 321 generates a single token 317 at a central location that can be detected by all of the nodes 303, each node 303 can take an action responsive to the detection of the token 317, such that the action indicates the point at which the token 317 was generated relative to the sequence of storage I/O operations 309 being executed by the given node 303. This process is described in detail below. As the term is used herein, an "atomically generated token 317" means a digital indication generated once and stored at a given location that can be separately detected by each one of a plurality of separate computing devices 210 (e.g., the multiple nodes 303 of the cluster 300). Before the token 317 is atomically generated at the central location, it does not exist and thus cannot be detected by any of the nodes 303. Once the token has been generated there, any or all of the nodes 303 can detect its presence. In different embodiments, different formats can be used for the token 317 as desired (e.g., a small file with specific content, attributes or the like).

In response to receiving the notification 315, each node 303 goes into token searching mode. In token searching mode, each node 303 checks the replication appliance 305 (or different centralized location) for the presence of the token 317 before executing each storage I/O operation 309. When a specific node 303 detects the presence of the token 317 at the central location prior to executing a specific storage I/O operation 309, the node 303 inserts a consistency marker 319 in its storage I/O stream 327 and then executes the storage I/O operation 309. As a result, the consistency marker 319 is present in the storage I/O stream 327 of the specific node 303, immediately before the first storage I/O operation 309 the specific nodes 303 executes after going into token searching mode and detecting the presence of the token 317. Once the specific node 303 has inserted the consistency marker 319 in its storage I/O stream 327, the node 303 exits token searching mode and continues executing I/O operations 309 without checking for the presence of the token 317. The position of consistency markers 319 in the storage I/O stream 327 of the group of nodes 303 is used to create a consistent cut 325, as described in more detail below. As the term is used herein, a "consistency marker 319" means a digital indication inserted into a specific position in a storage I/O stream 327, identifying a point in time at which the corresponding node 303 detected the token 317 on the central location relative to the node's execution of given storage I/O operations 309. In other words, the position of the marker 319 in the node's storage I/O stream 327 marks the state of the node's storage I/O at the time the token 317 was generated. Storage I/O operations 309 executed by the node 303 prior to its detection of the token 317 are located before the consistency marker 319 in the node's storage I/O stream 327, and those I/O operations executed subsequently to detecting the token 317 are located after the marker 319. In different embodiments, different formats can be used for the consistency marker 319 as desired (e.g., specific bit patterns or the like).

In one embodiments, any node 303 that is in token searching mode but does not have any storage I/O operations 309 to execute still polls the replication appliance 305 (or other central location) for the token 317 periodically. In this case, upon detecting the token 317, the node 303 inserts a consistency marker 319 in its storage I/O stream 327 and exits token searching mode. That way, the point in time at which the token 319 was detected is still indicated in that node's storage I/O stream 327 relative to its storage I/O operations 309. The interval at which to have nodes 303 without storage I/O operations 309 to perform poll for the presence of the token 317 is a variable design parameter.

A consistent cut creating module 323 of the consistent cut management system 101 uses the consistency markers 319 in the storage I/O streams 327 of each node 303 to create a consistent cut 325 capturing the ordered state of the storage I/O operations 309 from across the multiple nodes 303. More specifically, a storage I/O stream reading module 229 of the consistent cut management system 101 reads the storage I/O stream 327 of each one of the nodes 303, and identifies the position of the consistency marker 319 in the stream 327. Those I/O operations 309 before the consistency marker 319 in the I/O stream of a given node 303 are included in the consistent cut 325, whereas those after are not. Because each node inserts a consistency marker 319 in its storage I/O stream 327 in response to detecting the presence of a single, atomically generated token 317, the presence of the consistency markers 319 in the storage I/O streams 327 of the nodes 303 marks a point in time relative to the corresponding storage I/O operations 309 at which the token 317 was generated, and hence the time at which the consistent cut 325 is being taken.

Recall that although the replication appliance 305 receives the storage I/O operations 309 that are executed by each node 303 to the shared storage 307 for execution to replicated storage $307_{REPLICATED}$, the replication level processing of the storage I/O operations 309 originating from the multiple nodes 303 can be asynchronous, and thus the storage I/O operations 309 received by the replication appliance 305 can represent slightly different points in time, such that simply streaming the operations 309 to replicated storage $307_{REPLICATED}$ in the order received could violate dependent-write consistency and corrupt the data. However, because the consistent cut 325 identifies a discrete point in time accounting for the ordered state of the storage I/O operations 309 made by each of the multiple nodes 303, the consistent cut 325 can be used to maintain dependent-write consistency between the multiple nodes 303 in the execution of the I/O operations 309 to replicated storage $307_{REPLICATED}$ by the replication appliance (the replication stream).

For example, take the case in which computer A first executes write operation 1 to shared storage 307, and subsequently computer B executes write operation 2, such that write operation 2 is dependent on write operation 1. To maintain dependent-write consistency, the consistent cut 325 may contain only write operation 1 or may contain both write operation 1 and write operation 2, but may not contain only write operation 2. With the use of the atomically generated token 317 described above, if write operation 1 occurs after the time at which the consistent cut 325 is taken, write operation 1 will occur after the token 317 is generated. Hence, prior to executing write operation 1 the corresponding node 303 will have detected the token 317 and inserted the consistency marker 319 in its I/O stream 327, indicating that write operation 1 is outside of the cut 325. In this case, the node executing write operation 2, which comes after write operation 1, will detect the token 317 prior to executing write operation 2, since the token 317 is generated atomically, and thus that node 303 will also have inserted the marker 319 into its I/O stream 327, ensuring that write operation 2 is outside the cut 325. Thus, even if write operation 2 arrives at the replication appliance 305 before write operation 1, write operation 2 cannot be in the consistent cut 325 unless write operation 1 is also, thus maintaining dependent-write consistency.

Note that the consistent cut management system 101 accomplishes the above-described functionality without blocking storage I/O operations 309 on the nodes 303, in contrast to conventional replication technology, which requires blocking the storage I/O operations 309 of the group of nodes 303 in order to take a consistent cut 325 preserving dependent-write consistency in storage replication for multiple nodes 303. As described above, the consistent cut management system 101 creates a consistent cut 325 without blocking the storage I/O operations of the nodes 303 by utilizing the single atomically generated token 317 to cause each node 303 to insert a consistency marker 319 in its storage I/O stream 327. Therefore, the consistent cut management system 101 substantially improves the operation of both the replication appliance 305 and the nodes 303 of the cluster 300, by enabling the creating of the consistent cut 325 and corresponding replication of the shared storage 307 without blocking storage I/O operations 309 made by the nodes 303 to the primary storage destination.

Once a consistent cut 325 has been taken the consistent cut management system 101 deletes the token 317 (this can be done any time after each node 303 has exited token searching mode). When the next consistent cut 325 is to be taken, the consistent cut management system 101 again signals the nodes 303 to go into token searching mode, and atomically generates a new token 317, which causes each node 303 to insert a new consistency marker 319 in its storage I/O stream 327. The consistent cut management system 101 then uses the new consistency markers 319 to take a new consistent cut 325, using the methodology described above.

Although the above description describes the consistent cut management system 101 operating in the context of a cluster 300 of nodes 303 in which shared storage 307 is replicated, it is to be understood that the functionality of the consistent cut management system 101 can be applied within other network contexts (e.g., any network of multiple computing devices 210), and the primary storage and/or replicated storage can be in other forms, for example one or more LUNs 401, one or more volumes 403, one or more physical storage devices 160, a file system, virtual storage being accessed by a plurality of virtual machines running on a physical computer 210, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for maintaining dependent-write consistency to replicated storage corresponding to a primary storage destination, for write operations made by multiple ones of a group of storage Input/Output (I/O) sources to the primary storage destination, without blocking storage I/O operations to the primary storage destination, the method comprising the steps of:
   transmitting, by a centralized computing device, a notification to each storage I/O source in the group, the notification indicating to check a centralized location for presence of a token prior to each storage I/O operation to the primary storage destination;
   atomically generating the token by the centralized computing device at the centralized location, such that checking the centralized location prior to a storage I/O operation to the primary storage destination by the multiple ones of the group of storage I/O sources results in I/O sources detecting the presence of the token prior to executing corresponding storage I/O operations to the primary storage destination, the presence of the token indicating to each given detecting storage I/O source to insert a consistency marker in its storage I/O stream, proceed with the corresponding storage I/O operation to the primary storage destination, and stop checking for the presence of the token prior to subsequent storage I/O operations to the primary storage destination;
   reading the storage I/O stream of each storage I/O source of the group, by the centralized computing device, and identifying a position of an inserted consistency marker in each read storage I/O stream; and
   creating, by the centralized computing device, a consistent cut that captures an ordered state of storage I/O operations to the primary storage destination at a specific point in time made by the multiple ones of the group of storage I/O sources, without blocking storage I/O operations made by the storage I/O sources of the group to the primary storage destination, using the positions of the inserted consistency markers in the storage I/O streams of the multiple ones of the group of storage I/O sources.

2. The method of claim 1 further comprising:
   receiving asynchronously, by the centralized computing device, storage I/O operations executed by the multiple ones of the group of storage I/O sources to the primary storage destination, the received storage I/O operations to be executed by the centralized computing device to the replicated storage, wherein storage I/O operations to the primary storage destination received from multiples ones of the group of storage I/O sources represent different points in time; and
   using the consistent cut to maintain dependent-write consistency between the multiple ones of the group to the replicated storage, by the centralized computing device.

3. The method of claim 1 wherein:
   the group of storage I/O sources further comprises a plurality of nodes in a clustering and storage environment; and
   the primary storage destination further comprises shared storage utilized within the clustering and storage environment.

4. The method of claim 1 wherein the replicated storage further comprises:
   at least one volume in a clustering and storage environment being replicated to a secondary site.

5. The method of claim 1 wherein the primary storage destination further comprises:
   a replicated file system.

6. The method of claim 1 wherein the primary storage destination further comprises:
   at least one virtual storage device.

7. The method of claim 1 wherein the primary storage destination further comprises:
   at least one physical storage device.

8. The method of claim 1 wherein:
   the group of storage I/O sources further comprises a plurality of virtual machines running at a physical computer; and
   the primary storage destination further comprises a virtual machine disk files accessed by the virtual machines.

9. The method of claim 1 wherein the centralized computing device further comprises:
   a replication appliance.

10. The method of claim 1 further comprising:
    transmitting, by the centralized computing device, the notification to each storage I/O source in the group, the notification indicating to any storage I/O source that does not have any storage I/O operations to the primary storage destination to execute to periodically poll the centralized location for the presence of the token; and
    atomically generating the token by the centralized computing device, such that polling the centralized location by a storage I/O source results in the storage I/O source detecting the presence of the token, the presence of the token indicating to the storage I/O source to insert a consistency marker in its storage I/O stream and stop polling for the presence of the token.

11. The method of claim 1 further comprising:
    subsequently to the multiple ones of the group of storage I/O sources having detected the presence of the token at the centralized location, deleting the token prior to creating a second consistent cut.

12. The method of claim 1 further comprising:
    subsequently creating a second consistent cut, by the centralized computing device, by repeating the steps of transmitting the notification, atomically generating the token and reading the storage I/O stream of each storage I/O source of the group.

13. The method of claim 1 further comprising:
    receiving, by each storage I/O sources of the group, a notification to go into token searching mode;
    checking, by the multiple ones of the group of storage I/O sources, the centralized location for the presence of the atomically generated token before executing each storage I/O operation to the primary storage destination; and
    in response to detecting the presence of the atomically generated token at the centralized location by a specific storage I/O source prior to executing a specific storage I/O operation to the primary storage destination, the specific storage I/O source inserting a consistency marker in a storage I/O stream of the specific storage I/O source; and
    subsequently to the specific storage I/O source inserting the consistency marker in its storage I/O stream, executing the specific storage I/O operation to the primary storage destination, by the specific storage I/O source.

14. At least one non-transitory computer readable medium for maintaining dependent-write consistency to replicated storage corresponding to a primary storage destination, for write operations made by multiple ones of a group of storage Input/Output (I/O) sources to the primary storage destination, without blocking storage I/O operations to the primary storage destination, the at least one non-transitory computer readable medium storing computer executable instructions that, when loaded into computer memory and executed by at least one processor of a computing device, cause the computing device to perform the following steps:

transmitting, by a centralized computing device, a notification to each storage I/O source in the group, the notification indicating to check a centralized location for presence of a token prior to each storage I/O operation to the primary storage destination;

atomically generating the token by the centralized computing device at the centralized location, such that checking the centralized location prior to a storage I/O operation to the primary storage destination by multiple ones of the group of storage I/O sources results in I/O sources detecting the presence of the token prior to executing corresponding storage I/O operations to the primary storage destination, the presence of the token indicating to each given detecting storage I/O source to insert a consistency marker in its storage I/O stream, proceed with the corresponding storage I/O operation to the primary storage destination, and stop checking for the presence of the token prior to subsequent storage I/O operations to the primary storage destination;

reading the storage I/O stream of each storage I/O source of the group, by the centralized computing device, and identifying a position of an inserted consistency marker in each read storage I/O stream; and     creating, by the centralized computing device, a consistent cut that captures an ordered state of storage I/O operations to the primary storage destination at a specific point in time made by multiple ones of the group of storage I/O sources, without blocking storage I/O operations made by the storage I/O sources of the group to the primary storage destination, using the identified positions of the inserted consistency markers in the storage I/O streams of multiple ones of the group of storage I/O sources.

15. The at least one non-transitory computer readable medium of claim 14 further comprising:

receiving asynchronously, by the centralized computing device, storage I/O operations executed by the multiple ones of the group of storage I/O sources to the primary storage destination, the received storage I/O operations to be executed by the centralized computing device to the replicated storage, wherein storage I/O operations to the primary storage destination received from multiples ones of the group of storage I/O sources represent different points in time; and     using the consistent cut to maintain dependent-write consistency between the multiple ones of the group to the replicated storage, by the centralized computing device.

16. The at least one non-transitory computer readable medium of claim 14 wherein:

the group of storage I/O sources further comprises a plurality of nodes in a clustering and storage environment; and     the primary storage destination further comprises shared storage utilized within the clustering and storage environment.

17. The at least one non-transitory computer readable medium of claim 14 further comprising:

transmitting, by the centralized computing device, the notification to each storage I/O source in the group, the notification indicating to any storage I/O source that does not have any storage I/O operations to the primary storage destination to execute to periodically poll the centralized location for the presence of the token; and     atomically generating the token by the centralized computing device, such that polling the centralized location by a storage I/O source results in the storage I/O source detecting the presence of the token, the presence of the token indicating to the storage I/O source to insert a consistency marker in its storage I/O stream and stop polling for the presence of the token.

18. The at least one non-transitory computer readable medium of claim 14 further comprising:

subsequently to multiple ones of the group of storage I/O sources having detected the presence of the token at the centralized location, deleting the token prior to creating a second consistent cut.

19. The at least one non-transitory computer readable medium of claim 14 further comprising:

subsequently creating a second consistent cut, by the centralized computing device, by repeating the steps of transmitting the notification, atomically generating the token and reading the storage I/O stream of each storage I/O source of the group.

20. A computer system for maintaining dependent-write consistency to replicated storage corresponding to a primary storage destination, for write operations made by multiple ones of a group of storage Input/Output (I/O) sources to the primary storage destination, without blocking storage I/O operations to the primary storage destination, the computer system comprising:

a processor;

system memory;

a notification transmitting module residing in the system memory, the notification transmitting module being programmed to transmit a notification from a centralized computing device to each storage I/O source in the group, the notification indicating to check a centralized location for presence of a token prior to each storage I/O operation to the primary storage destination;

a token generating module residing in the system memory, the token generating module being programmed to atomically generate the token at the centralized location, such that checking the centralized location prior to a storage I/O operation to the primary storage destination by multiple ones of the group of storage I/O sources results in I/O sources detecting the presence of the token prior to executing corresponding storage I/O operations to the primary storage destination, the presence of the token indicating to each given detecting storage I/O source to insert a consistency marker in its storage I/O stream, proceed with the corresponding storage I/O operation to the primary storage destination, and stop checking for the presence of the token prior to subsequent storage I/O operations to the primary storage destination;

a storage I/O stream reading module residing in the system memory, the storage I/O stream reading module being programmed to read the storage I/O stream of each storage I/O source of the group, and to identify a position of an inserted consistency marker in each read storage I/O stream; and     a consistent cut creating module residing in the system memory, the consistent cut creating module being programmed to create a consistent cut that captures an ordered state of storage I/O operations to the primary storage destination at a specific point in time made by multiple ones of the group of storage I/O sources, without blocking storage I/O operations made by the storage I/O sources of the group to the primary storage destination, using the positions of the inserted consistency markers in the storage I/O streams of multiple ones of the group of storage I/O sources.

* * * * *